Sept. 13, 1966 E. RADOCY 3,273,108
IMPACT SOCKET CONNECTOR
Filed Oct. 21, 1963
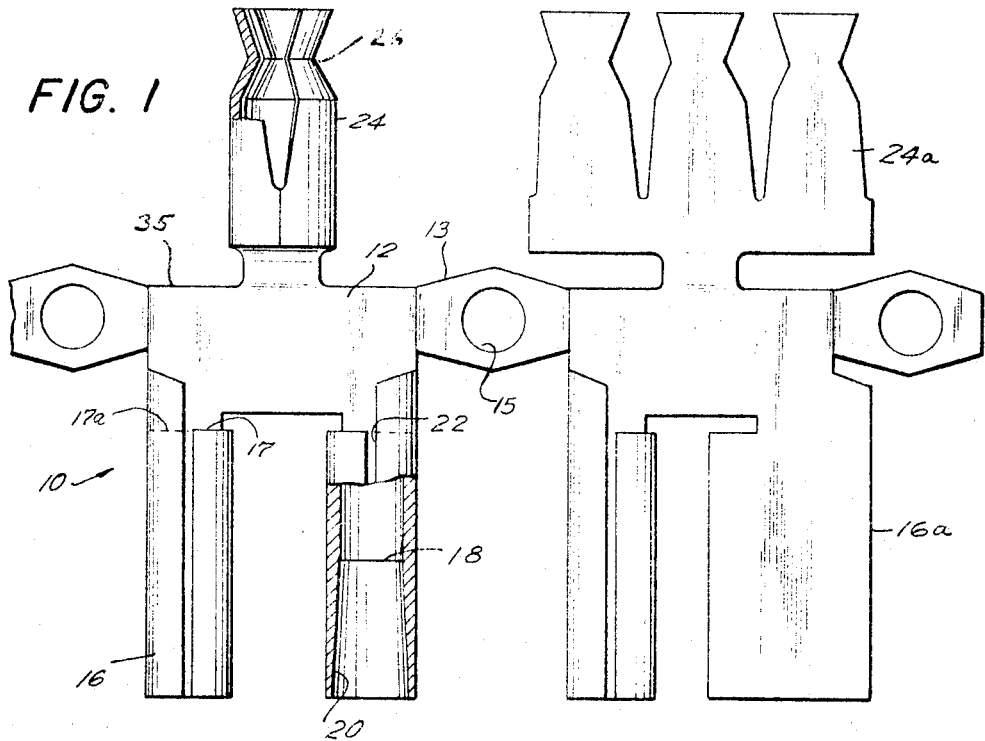
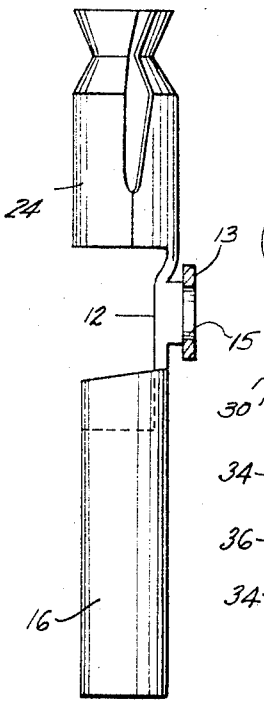
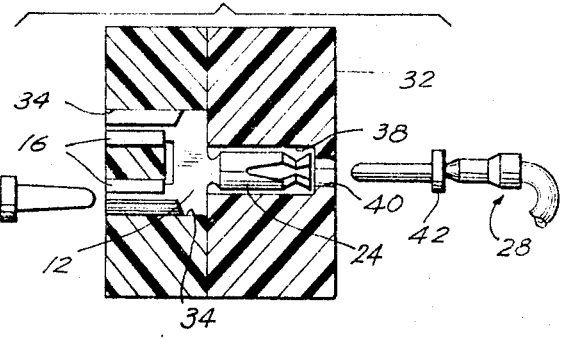
INVENTOR.
ERNEST RADOCY
BY Howard H. Reiter
ATTORNEY United States Patent Office 3,273,108
Patented Sept. 13, 1966

3,273,108
IMPACT SOCKET CONNECTOR
Ernest Radocy, Norwalk, Conn., assignor to Burndy Corporation, a corporation of New York
Filed Oct. 21, 1963, Ser. No. 317,536
2 Claims. (Cl. 339—210)

This invention relates generally to tubular socket connectors having a tapered inner cavity into which tapered pins are forced or impacted to achieve electrical contact between the two parts. More particularly, the invention relates to tubular tapered socket connectors formed of sheet metal and to a method of forming the same.

Tubular tapered socket connectors, formed by boring and turning, or otherwise shaping seamless tubing are generally well known in the connector art. "Seamless" tubing in this sense refers to tubular bodies having a continuous, i.e. unbroken outer periphery, and thus may include extruded, bored, and brazed or welded seam, tubing.

Since cutting away of stock material as a manufacturing process is expensive in terms of time and equipment and wasteful of material, and seamless tubing is relatively expensive, it has previously been attempted to construct tapered socket connectors from sheet metal. This construction has been achieved by forming sheet metal cones or frustums having identically tapered inner and outer surfaces. The disadvantages inherent in this tapered socket construction are explained below.

Due to the high internal radial bursting forces encountered in normal use, taper sockets require high resistance to deformation from outward radial forces. Such resistance may be obtained by mounting the individual connectors in relatively strong housings having connector seating cavities which narrowly confine the periphery of the connector along a substantial part of its length. In the case of the conical sheet metal sockets described above, this requires the use of housings having conically shaped seating cavities. Such conical cavities are particularly disadvantageous, however, in that they necessitate two-part housings having longitudinal parting lines through each cavity; in unitary housings having conical cavities, assembly of the connector and housing is limited to insertion and withdrawal of the connector through the front of the cavity only. Tubular taper sockets, on the other hand, (i.e. taper sockets having a cylindrical exterior) may be used with simple cylindrical cavities with consequent ease of assembly and housing construction, and without sacrificing any strength or support advantages.

Accordingly it is an object of the present invention to provide a taper socket connector having a cylindrical exterior and tapered interior, which is formed of relatively inexpensive sheet metal.

It is a related object of the invention to provide a sheet metal connector that is tapered in such a manner as to permit a uniform support to be applied when a tapered pin is force fitted therein, to thus retain its shape under the developed pressures.

Other objects are to provide a sheet metal tapered socket connector that may be made in strip form to permit multiple connections from the same piece of metal; to provide a tapered socket connector that may be formed integrally with more of the same or other types of connections which may be more readily separable, to permit greater flexibility in use.

These and other objects, and the new results achieved, will become more apparent from a consideration of the device hereinafter described, specifically pointed out in the claims, and illustrated in the drawings forming a part of this specification, in which:

FIGURE 1 is a plan view of a strip of sheet metal showing a partly developed and a partly sectioned multiple connector strip formed in accordance with this invention.

FIGURE 2 is a side elevation view of one completed connector of the strip of FIGURE 1;

FIGURE 3 is an exploded plan view of the common faces of the two halves of a housing suitable for receiving the connector of FIGURE 2; and FIGURE 4 is a longitudinally sectioned view of the assembled housing of FIGURE 3 having a single connector shown in assembled position, and with a taper and a conventional pin contact shown about to be coupled thereto.

Referring now more in detail to the drawing, reference numeral 10 designates generally a strip of sheet metal made of copper or other conductive metal suitable for manufacture into electrical connectors. From the main body 12 of the strip, substantially flat tongues of metal are blanked to the shapes shown at 16a and 24a, which, when cylindrically bent or rolled, form the generally tubular shapes of socket connectors 16 and 24. Before the rolling operation the blank tongue 16a, which will form the interiorly tapered socket connector 16, is coined on the surface visible in the drawing (starting from line 18 for example) to taper the thickness of the sheet and form a bevelled surface as at 20. The coining operation may leave the rear portion of the tongues flat as shown, or the entire blank may be tapered if desired. Thus, the blanks form cylinders of uniform outer diameter and tapered inner diameter when rolled to form a socket as described. A small gap 22 between the longitudinal edges of each rolled blank provides tolerance for adjusting the completed sockets to dimensional variations in the housing and the connectors.

An important advantage derived from the continuous strip formation of these connectors is that they may be separated and used individually, or groups of them may be allowed to remain attached for use as integrally joined bussing strips. Thus, each multiple socket connection of the strip 10, is joined to the adjacent connections by an integral joint strip portion 13. Portion 13 may be formed in a U-shape as indicated in FIG. 2 to allow for slight relative longitudinal shifting of adjacent connections. The portion may further be perforated as at hole 15 to improve flexibility of the continuous strip and to provide means for engagement of the strip by the indexing mechanisms of automatic strip handling apparatus. When it is desired to separate the individual connectors of the strip, the strip may be severed adjacent each unit parallel to the side of sockets 16, and portions 13 may be discarded.

The particular strip of connectors illustrated, which is shown as but one possible embodiment of the many that may be formed in accordance with this invention, also includes conventional pin socket 24 which is formed by cylindrically rolling the blank tongues 24a extending from the side of the strip opposite sockets 16. A constricted neck portion 26 may be formed in the socket during the rolling process to improve grasping of the pin connector 28 (shown in FIGURE 3) and to assure electrical contact therewith.

An insulating housing having two halves 30 and 32, suitable for mounting one or more of the illustrated individual connectors, is shown in FIGURES 3 and 4. One housing half 30 is formed with two cylindrical bores 34 which receive the two tapered sockets 16, and with a slot 36 extending between the two bores for receiving the strip body 12 which joins the two sockets. The other housing half 32 contains a bore 38 for receiving resilient socket 24, and terminates in a bore 40 of lesser diameter which forms a "closed entry" barrier to prevent insertion of oversize pin contacts into the socket. The connectors and housing are assembled by depositing the strip body 12 in the slot 36 of housing half 30 with the sockets 16 positioned in the bores 34. The housing half 32 is then placed over the extending pin socket 24, and the two housing halves are clamped or cemented together in any conventional manner (not here illustrated). The socket connectors are thus secured in position for use.

In the illustrated embodiment, the rear edge 35 of strip body portion 12 abuts the interface surface of housing half 32 and serves as a backstop for resisting impacting forces. Alternatively, the entire rear edge 17 of sockets 16 may be made square cut, as shown by dot-dash lines 17a in FIGURE 1, and abutted directly against the interface surface of housing half 32 to act as a more direct backstop for impacting forces. This could be readily accomplished with a housing such as is herein illustrated by receiving strip body portion 12 in half section 32, rather than in half section 30, within a slot comparable to illustrated slot 36.

Following assembly of the connectors and the housing, pin connectors 28 may be inserted into spring socket 24 through restricted bore 40, until stopped by shoulder 42 which is formed on the pin connector. Similarly, taper pins 44 may be impacted into taper sockets 16 until firmly secured therein.

The characteristic features of force fitted taper pin connections, and conventional pin connections are well known and need not be further described here.

When a taper pin 44 is force fitted into one of the taper sockets 16, the sheet metal walls of the socket are forced radially outward against the inner wall surfaces of bores 38. The uniformly cylindrical outer surfaces of the sockets 16 may be made to fit perfectly against the cylindrical wall surfaces of the bores 38 initially or after expansion due to insertion of a pin. In either event a firm uniform support is provided over the length of the sockets 16 when taper pins 44 have been inserted and wedged against the inner socket taper 20.

The supporting effect of the insulating housing on the outer surface of the contacts permits excellent, high-retention-force, taper pin connections to be made despite the use of a sheet metal split sleeve construction for the taper sockets.

This construction also permits a plurality of taper sockets to be integrally formed from a sheet metal strip body having other integrally attached connector bodies for achieving interconnections with a plurality of mating contacts of the same and/or different types.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendent claims, and by means of which objects of this invention are attained and new results accomplished, as it is obvious that the particular embodiments herein shown and described are only some of the many that can be employed to obtain these objects and accomplish these results.

I claim:

1. An electrical connector assembly including a tapered socket electrical connector which may be simply and economically formed by arcuately bending and rolling into tubular shape a unitary piece of substantially flat sheet metal having a portion of uniformly varying thickness, comprising:

a housing member of dielectric material including two parts abutting at a common interface;

a socket contact member including at a forward end thereof a tubular body portion of rolled sheet stock characterized by a pair of longitudinally extending substantially opposed edges;

said body portion having a cylindrical outer surface of substantially uniform diameter, wherein the thickness of said sheet stock varies uniformly from a given value proximate one end of said tubular body to a lesser thickness at the other end thereof, thereby defining a conically tapered interior surface within said body portion for receiving a taper pin connector in force fit relationship;

said socket contact member further including at a rearward end thereof an electrical connection portion;

one part of said housing member having a cylindrical bore therethrough for receiving said tubular body portion therein, and the remaining part of said housing member having an opening therein for receiving said electrical connection portion;

said socket contact member still further including a shoulder thereon substantially intermediate the forward and rearward ends thereof for engaging said housing member to transmit thereto rearwardly directed forces applied to said tubular body portion during insertion of a taper pin contact therein.

2. An electrical connector assembly in accordance with claim 1 wherein said housing member includes a plurality of substantially parallel cylindrical bores therein, and said contact member includes a plurality of tubular body portions and an integral strip portion laterally interconnecting said tubular portions.

References Cited by the Examiner

UNITED STATES PATENTS

| | | | |
|---|---|---|---|
| 1,623,064 | 4/1927 | Napier | 29—190 X |
| 2,056,248 | 10/1936 | Buchanan | 339—268 |
| 2,379,424 | 7/1945 | Clinkscale et al. | 339—268 X |
| 2,596,528 | 5/1952 | Carlson | 339—223 |
| 2,663,753 | 12/1953 | Bird | 339—258 X |
| 2,727,299 | 12/1955 | Klumpp. | |
| 2,799,841 | 7/1957 | Macy | 339—276 |
| 2,937,357 | 5/1960 | Kennedy | 339—273 X |
| 2,958,845 | 11/1960 | Dupre et al. | 339—273 X |
| 3,070,769 | 12/1962 | Murphy | 339—192 X |
| 3,140,139 | 7/1964 | Urban | 339—192 |

FOREIGN PATENTS

| | | |
|---|---|---|
| 1,108,263 | 8/1955 | France. |
| 710,404 | 6/1954 | Great Britain. |

EDWARD C. ALLEN, *Primary Examiner.*

JOSEPH D. SEERS, *Examiner.*

R. E. MOORE, *Assistant Examiner.*